Aug. 9, 1966 R. C. COOPER 3,265,584

NUCLEAR REACTOR VIEWING SYSTEM

Filed Nov. 13, 1963

INVENTOR.
RICHARD C. COOPER
BY
Price + Heneveld

United States Patent Office 3,265,584
Patented August 9, 1966

3,265,584
NUCLEAR REACTOR VIEWING SYSTEM
Richard C. Cooper, 8125 Bailey Drive SE., Ada, Mich.
Filed Nov. 13, 1963, Ser. No. 323,464
3 Claims. (Cl. 176—19)

This invention relates to nuclear reactor units, and more particularly to a nuclear reactor internal viewing system.

Extensive experimentation is presently conducted with radiant energy. High energy radiation experimentation presents many unique problems of observation because of the precautionary measures necessary for safety purposes. A well-known expedient for observing radiant effects on materials during the process of irradiation is the deep pool arrangement enabling experimenters to observe the operation through several feet of water. Another common expedient is to view the radio-active material through a thirk block of special glass. Both of these are highly advantageous for some uses, but both have definite limitations. For example, both are largely employed for subcritical radiation environments since a supercritical mass is simply too dangerous to handle in these environments. Also the glass block type is not suitable for very high energy-high mass materials.

Those branches of experimental engineering and testing dealing with supercritical masses such as is encountered with an operational nuclear reactor are definitely limited in the type of observations which can be made during the experimentation process. In fact, visual observations are largely limited to the static results of a substance or article after the process is conducted and is removed from the irradiating source rather than the dynamic process in operation.

This same limitation occurs with regard to the observation of reactor component such as vessels, fuel rods, pressure tubing and the like during supercritical operation. Such observations, if they could be made, would render invaluable engineering solutions to structural problems, operational limits, causes of localized "hot spots" and failure of components under stress. This is especially true with reactors employing a flowing material such as a high temperature liquid fuel slurry of a metallic medium such as the eutectic of sodium and potassium, or such as deterium oxide.

Providing peep holes into a reactor is not the solution since radiation leakage presents too great a danger to the observer. Even periscopic lens arrangements provide too much intermediate air space enabling high level radiation leakage.

It is an object of this invention to provide a safe, reliable, high quality optical viewing system of observation for the interior of a nuclear reactor chamber, even when the reaction is occurring from a supercritical mass. The system enables experimenters to actually constantly observe the interior of the reactor without any significant increase in danger than the normal probabilities from high energy radiation.

It is another object of this invention to provide a nuclear reactor observation system enabling a scanning of a fairly large area of predetermined dimension and locality to be optically observed as necessary, thereby enabling potential trouble areas to be constantly checked for experimental data. It also enables irradiation of test objects to be actually optically observed during the dynamic process itself, without the necessity of a deep water pool or a thick special glass block. It is furthermore not limited to subcritical environments.

Still a further object of this invention is to provide an actual optical viewing system for reactor vessels and related components, allowing portions of an area to be viewed, and enabling the exact portion to be changed in a controlled manner with excellent accuracy.

A further object of this invention is to provide an optical transmission system for a nuclear reactor enabling spectral energy outside the wave length of visible light, and in the infrared and ultraviolet light range to be sensed and measured for a particular area inside the reactor.

Another object of this invention is to provide a viewing system for the inside of high activity radiation areas, that has controlled adjustability for selection of the area portion to be viewed and also effects illumination of the area with controlled light from the exterior of the reactor. The illumination source may be of ordinary spectral light, or if desired, of ultraviolet light or infrared light. The light source can be varied in type and/or intensity. It may be replaced without difficulty or danger.

Still a further object of this invention is to provide an illuminated reactor interior observation system having a light source outside the reactor with controlled positioning of the focused light inside the reactor to be illuminated and observed.

These and several other objects of this invention will become apparent upon studying the following specification in conjunction with the drawings in which.

Figure 1:
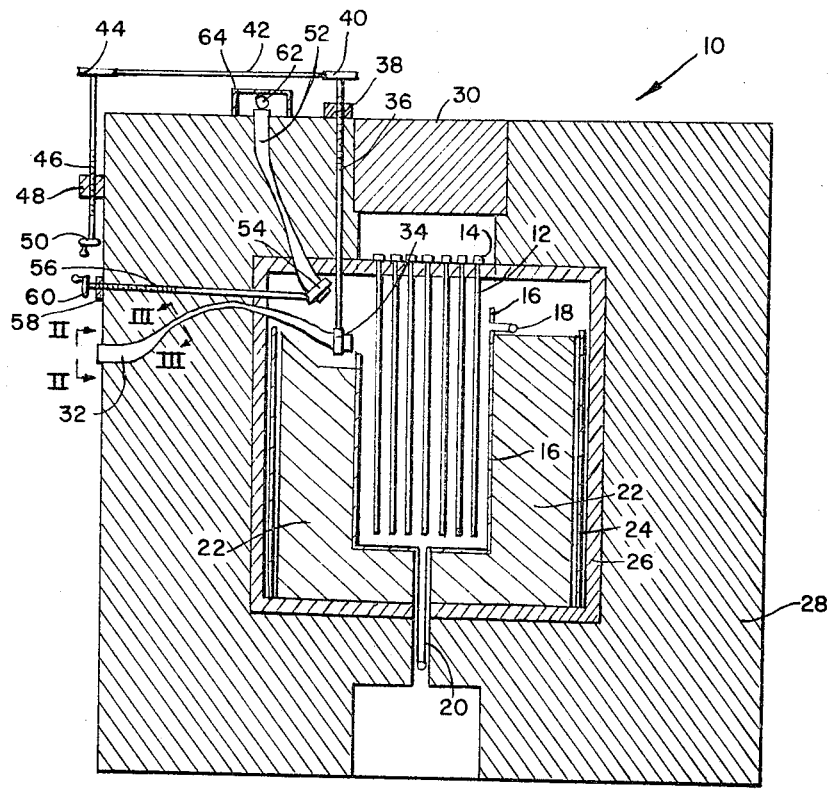
FIG. 1 is an elevational view of one type of reactor system employing the novel features.

Referring now specifically to the drawings, the novel system 10 includes a nuclear reactor in combination with a unique viewing system. The reactor includes suitable fuel rods 12 containing a portion of fissionable material such as uranium 235 or of any other desired type of which dozens of variations are well-known to those in the field. The fuel rods may be regulated by suitable support means 14 in conventional manner.

In this particular type of reactor the fuel rods are suspended in a liquid containing vessel 16. The vessel may include a suitable deterium oxide i.e. "heavy water" medium. In order to recombine the recirculating deterium oxide broken down by radiation an outlet conduit 20 from the bottom of the vessel or tank associates with a suitable recombination unit of conventional type (not shown) outside the reactor. It re-enters through conduit 18 associated with the top of the vessel. The reflector for the reactor may be a graphite material 22 surrounding the fuel elements in conventional manner. These will ordinarily be blocks. An intermediate thin aluminum shield 24 surrounds this graphite reflector, while a cast iron shield 26 surrounds the entire assembly.

A thick body of absorptive shielding 28, for example of concrete, supplemented by various embedded absorbing materials such as boron in conventional fashion, surrounds and envelopes the entire assembly.

In the top portion of the concrete shielding 28 is a removable plug 30 sealingly engaged with the surrounding shielding in an opening provided for removal, and replacement of fuel rods. The entire apparatus may be an experimental reactor. The particular unit shown resembles the experimental facilities of the heavy water reactor at Saclay, France.

It will be obvious to those having ordinary skill in the art that this is merely one illustrative type of reactor to show a complete form of the invention. The combination and system can be employed with any of many different types, styles, and designs of reactors, and fuel arrangements and systems. The geometry of the fuel elements to form the critical mass will, of course, vary widely with the type of structure employed and the results desired. Also, it will be obvious that certain changes in the critical mass geometry may be made to accommodate the presence of the optical system. Since, however, the optical bundle and light tube, to be described, are a glass base which does not interfere significantly with the critical mass, this variation will normally be small.

Extending through the shielding material, and as shown in FIG. 1 through the outer main shielding 28 and the cast iron jacket 26, is a fiber optic bundle 32. This flexible fiber optic bundle is composed of smooth filaments or fibers of transparent material such as glass which conducts the light with high efficiency by means of total internal reflections along the walls. The two ends of the fiber bundle are held securely in exactly like orientation with respect to each other. Preferably the ends of the bundles are surrounded by a jacket according to conventional technology to hold the fibers in specific relationship with respect to each other. Alternatively, the fibers may be embedded or encased in a suitable resin such as a poly epoxy resin. The number of fibers is not critical and depends upon the size of image desired. Normally around 200,000 to 850,000 fibers of small diameter are satisfactory. Each fiber is normally around four to ten microns in diameter. The individual fibers can be grouped collectively into the bundle, or can be in small groupings of multi-fibers initially grouped and then compiled. In this instance, it is more convenient to employ multi-fibers with a total of up to around five hundred thousand, more or less.

Each of the fibers is basically of a flint type glass formed drawing. Each fiber is optically insulated with a coating of material, preferably a low refracted index fiber core. In some situations organic materials such as lacquers or ethyl silicate coatings can be used but are not preferred.

Also, in certain instances, it is preferable to have a second coating of strongly absorbent non-transparent material over the glass coating. This is to reduce or eliminate stray light. A typical refractive index for the core glass is about 1.62 but can vary anywhere from about 1.55 to 1.75 or so. The refractive index of the optically insulating glass coating is smaller in each case, but generally in this range also.

Figure 2:
FIG. 2 is a sectional view of the exterior end face of an optical bundle employed within the system.
Figure 4:
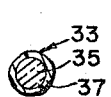
FIG. 4 is an enlarged sectional view of one of the fibers in the bundle of FIG. 2.

Referring to FIGS. 2 and 4, the fiber bundle 32 shown is made up of smaller fibers 33. Fibers 33 in this bundle are shown exaggerated and schematically due to the impossibility of actually showing thousands of tiny fibers themselves. Each of these fibers 33 is illustrated enlarged in FIG. 4, including its central glass core 35 and optical insulator cladding 37.

The arrangement of the polished end surfaces of the fibers in the outer end of the fiber bundle 32 forms a coherent organized face for viewing. The internal end of the fiber bundle forms a like face of the same arrangement of fibers as the outer face for transmitting a coherent image through the fibers for external viewing.

Figure 3:
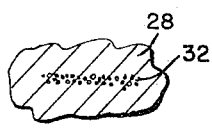
FIG. 3 is a sectional view taken on plane III—III of FIG. 2 of the bundle in FIG. 2.

The intermediate portion of the fiber bundle between these two ends is sealingly embedded in the shielding of the reactor. This intermediate portion is not linearly oriented to the ends, but is offset, or displaced, a substantial amount so that no straight line can be drawn from any portion of the inner face through the fiber bundle to the outer face. Preferably this offset is at least several inches and up to a foot or two in dimension. In some situations it is advisable to form two or three undulations in the fiber bundle within the shielding. Also, the fibers in this intermediate portion are dispersed as illustrated, for example, in FIG. 3. These fibers are spread into an elongated dimension with the individual fibers substantially dispersed from each other and sealingly embedded in the shielding material.

Figure 5:
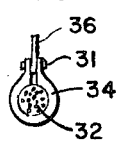
FIG. 5 is a sectional fragmentary view of the adjustment means forming a portion of the control means forming part of the optical apparatus in the structure of FIG. 1.

The inner end of the fiber bundle is free to flex as necessary. Around this inner end is suitable position adjustment means, for example, in the form of a collar 34. This split collar, as illustrated in FIG. 5, may include a pair of flanges connected by a bolt 31 to a control shaft 36. This control shaft may assume the form of a screw shaft extending upwardly through the top of the reactor. It is in engagement with an affixed block 38 having an internal threaded aperture receiving this shaft. Affixed to the top end of this shaft is a pulley 40 around which a belt or chain 42 extends. This belt also extends around a second pulley 44 mounted on a second shaft 46 extending down the side of the reactor. This second shaft is mounted in a control block 48 affixed to the side of the reactor and including a threaded aperture. A control crank 50 is affixed to the lower end of this second screw shaft. It will be noted that by rotating the crank 50, shaft 46 rotates pulley 48 to drive belt 42 and rotate pulley 40. This pulley in turn raises and lowers the screw shaft 36 to raise and lower collar 34 and thus the flexible inner end of the fiber optic bundle. This enables scanning of an area inside the reactor to look for trouble spots or to observe radiation effects on an experimental item inserted into the reactor through a suitable experimental channel (not shown). The adjustment means is therefore regulated by the control means extending out of the reactor. It will be obvious to those in the art that this control means may be modified in various ways for mechanical expediency, since the form shown is only one type of possible mechanical structure suitable for the operation. Equivalent mechanical structures or hydraulic mechanisms can be substituted.

The normal flint glass employed for the fiber optics and produced for example by American Optical Corporation or Bausch and Lomb, Inc. or other of the optical fiber producers, is suitable for the transmission of visible spectral wave lengths and infrared wave lengths. These will normally transmit within the wave length range of about 400 millimicrons to about 1700 to 1800 millimicrons depending upon the specific refractive index of the fiber glass core and also the best image is obtained if the length does not exceed about 6 to 10 feet. It will be realized that the wave length range of transmission narrows somewhat with longer lengths. If it is desired to have higher quality infrared transmission, a glass such as arsenic trisulfide glass can be employed.

In most instances it is desirable to have a source of illumination of the particular zone to be observed in the reactor. However, the type of illumination desired would vary. Also control over the area to be illuminated is highly desirable while observing a variable area with a flexible controlled fiber optic scope.

Accordingly a light pipe or i.e. a second fiber optic bundle 52 is extended sealingly through the shielding of the reactor from the exterior to the interior. Preferably the intermediate portions of this bundle are also displaced and the fibers are spread, but this is not essential since the viewer will not normally have his face immediately adjacent the outer surface face of the bundle. Rather, a source of illumination 62, preferably within an illuminating shield 64, is positioned adjacent this outer face. The light is conducted through the bundle to the internal portions of the reactor. The fibers of this bundle sealed in the shielding, prevent leakage of radiation. In this pipe the fibers need not necessarily be clad with a second refractory material since only light is transmitted therethrough and not necessarily an image.

Preferably the interior end of the bundle is flexible and received within a collar 52 like collar 34. This collar is connected with a suitable control means for adjustment thereof. This control means may include the screw shaft 56 extending through the shielding of the reactor to a threaded control block 58 mounted to the exterior of the reactor. A suitable crank handle 60 is attached thereto on the outer end for adjustment of the light pipe inner end.

It will be readily observed that the desired type of illuminating or spectral energy source 62 can be employed to observe various effects taking place in the reactor during operation. The light wave length range and intensity can be changed readily without difficulty or danger. Also one source can be replaced by another. An operator standing by the reactor can simultaneously control crank 60 and crank 50 to illuminate any particular area and simultaneously optically observe that area while the reactor is in operation, yet with protection from radiation. The spectral energy transmitted through the fiber bundle 32 is limited within the radiant energy range of approximately 350 millimicrons to 1800 millimicrons. Consequently, gamma rays are not transmitted to the pipe but rather are absorbed by the surrounding shielding so that the operator is protected. Consequently, for the first time, as far as is known, the dynamic operation taking place with concomitant high energy radiation can be optically and visually observed by an operator with safety.

It will be obvious that the two bundles, instead of being independently mounted and controlled, can be retained in the same collar, so that adjustment of one will automatically adjust the other. Thus, the bundles can be placed side-by-side, or alternatively the light pipe bundle can be arranged in annular form around the adjacent bundle. Other variations on this same principle are possible within the concept presented. Further, minor modifications to suit a particular type of reactor or surroundings or condition to be observed will of course be necessary in application. This invention is therefore not to be limited to the specific forms illustrated and preferred but only by the scope of the appended claims and the reasonably equivalent combinations to those defined therein.

I claim:

1. In a nuclear reactor, a mass of fissionable material; radioactive shielding around said mass; a fiber optic bundle viewing means extending from the exterior of said reactor, through said shielding, to the interior thereof; the fibers at the exterior face of said bundle being arranged like the fibers at the interior face thereof; the intermediate portion of said bundle being undulated in said shielding with a configuration such that a straight line cannot be extended from said interior face, through said bundle, to said exterior face; the inner end portion of said bundle being flexible and free to move; shifting means on said flexible inner end of said bundle, and control means extending from said shifting means through said shielding to the exterior of said reactor for selected movement of said interior bundle face from outside the reactor.

2. In a nuclear reactor, a mass of fissionable material; radioactive shielding around said mass; a fiber optic bundle viewing means extending from the exterior of said reactor, through said shielding, to the interior thereof; the fibers at the exterior face of said bundle being arranged as the fibers at the interior face thereof; the intermediate portion of said bundle being bowed in a curved configuration in said shielding such that a straight line cannot be extended from said interior face, through said bundle, to said exterior face; the inner end portion of said bundle being flexible and free to move; shifting means on said flexible inner end of said bundle, and control means extending from said shifting means through said shielding to the exterior of said reactor for selected movement of said interior bundle face from outside the reactor; a light transmission pipe extending from the exterior of said reactor, through said shielding, into the reactor, with its inner face adjacent the interior face of said fiber bundle, and a light source adjacent the outer face of said pipe externally of said reactor for illuminating an area to be observed.

3. In a nuclear reactor, a mass of fissionable material; radioactive shielding around said mass; a fiber optic bundle viewing means extending from the exterior of said reactor through said shielding, to the interior thereof; the fibers at the exterior face of said bundle being arranged like the fibers at the interior face thereof; the intermediate portion of said bundle being in a curved configuration in said shielding such that a straight line cannot be extended from said interior face, through said bundle, to said exterior face; the inner end portion of said bundle being flexible and free to move; shifting means on said flexible inner end of said bundle, and control means extending from said shifting means through said shielding to the exterior of said reactor for selected movement of said interior bundle face from outside the reactor; a light transmission pipe extending from the exterior of said reactor, through said shielding, with its inner face adjacent the interior face of said fiber bundle; a light source adjacent the outer face of said pipe; said pipe being formed of flexible fibers; adjustment means on the inner end portion of said light pipe, and control means extending from said adjustment means through said shielding to the exterior of said reactor, whereby an observer outside said shielding can safely view selected portions of the reactor interior.

References Cited by the Examiner

UNITED STATES PATENTS

| | | | |
|---|---|---|---|
| 2,868,992 | 1/1959 | Monk | 250—108 |
| 3,010,357 | 11/1961 | Hirschowitz | 88—1 |
| 3,041,916 | 7/1962 | Clave et al. | 88—1 |

LEON D. ROSDOL, *Primary Examiner.*

REUBEN EPSTEIN, CARL D. QUARFORTH,
*Examiners.*

M. R. DINNIN, H. E. BEHREND, *Assistant Examiners.*